United States Patent [19]

Wix

[11] 4,205,629
[45] Jun. 3, 1980

[54] ADJUSTABLE HEIGHT BOWL HOLDING APPARATUS

[76] Inventor: Thomas R. Wix, 6836 N. 15th St., Phoenix, Ariz. 85014

[21] Appl. No.: 899,507

[22] Filed: Apr. 24, 1978

[51] Int. Cl.² .................. A01K 5/00; F16M 13/02
[52] U.S. Cl. ................................ 119/51.5; 119/61; 248/221.2; 248/311.1 A; 211/75
[58] Field of Search ............... 119/51.5, 61, 68; 248/132, 221.2, 226.3, 227.1, 311.1 A, 315; 211/75

[56] References Cited

U.S. PATENT DOCUMENTS

| 2,320,828 | 6/1943 | Murphy | 119/61 X |
| 2,658,709 | 11/1953 | Kendall | 119/61 X |
| 4,103,778 | 8/1978 | Bradshaw | 211/208 X |

*Primary Examiner*—Russell R. Kinsey
*Assistant Examiner*—Robert P. Swiatek
*Attorney, Agent, or Firm*—Don J. Flickinger

[57] ABSTRACT

A horizontal frame member is detachably securable at selectable locations along an upright support member. The frame member includes a parametric element which detachably holds a bowl, especially a conventional animal feeding dish.

3 Claims, 5 Drawing Figures

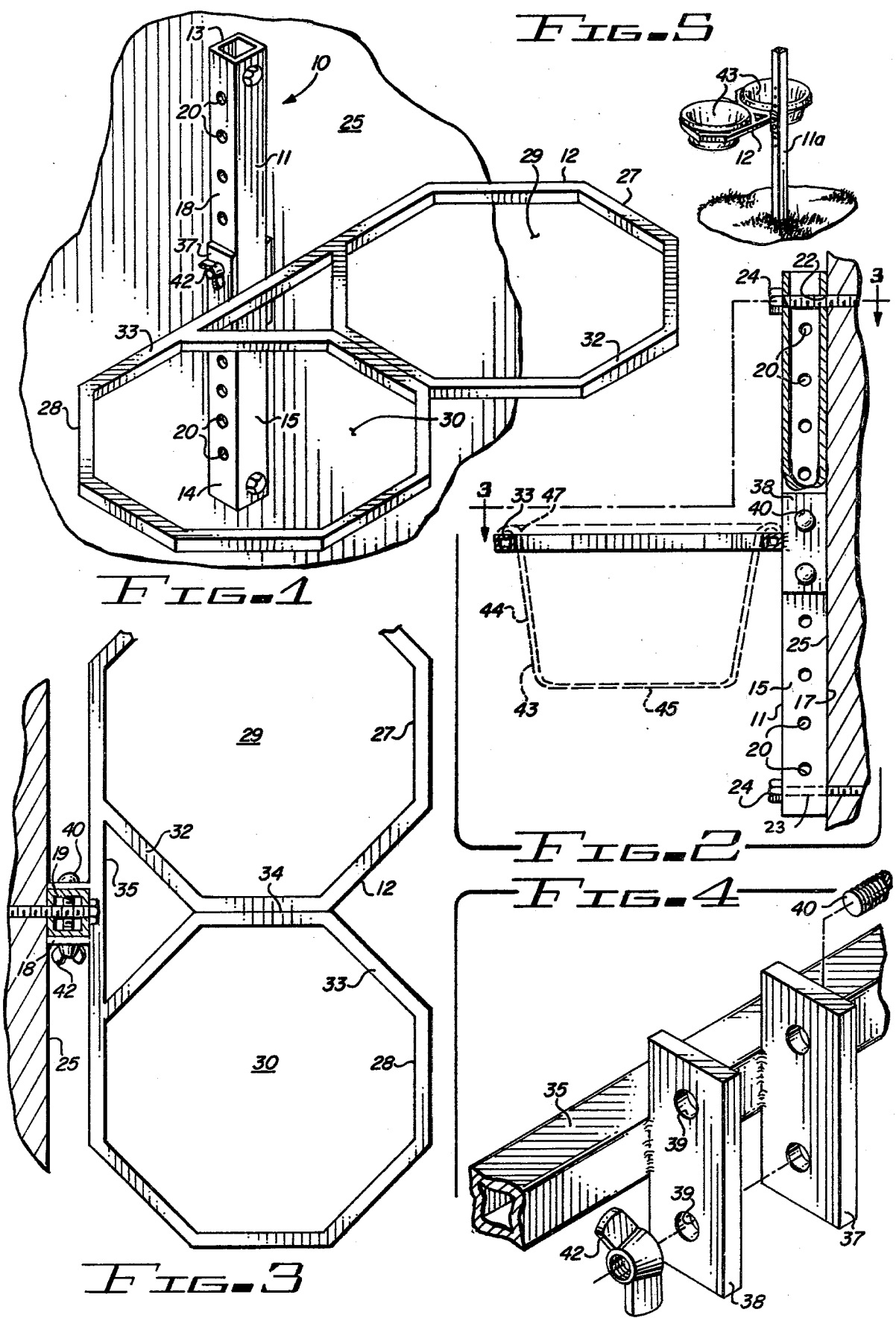

ADJUSTABLE HEIGHT BOWL HOLDING APPARATUS

This invention relates to feeding apparatus for animals.

More particularly, the present invention relates to apparatus for feeding animals at adjustable heights.

And a further aspect of the present invention concerns apparatus for detachably supporting a conventional bowl at selectable heights.

Conventionally, owners of pet animals, such as dogs and cats, utilize a pair of dishes for feeding purposes. One of the dishes is periodically filled with food, while the other dish is maintained with a continuous supply of water. The bowls are generally placed side by side at a convenient location about the home, either indoors or outdoors. An analogous arrangement is used by professional breeders at kennels. Similar facilities, using proportionately sized bowls, are frequently provided for larger animals, such as horses.

Recently, it has been recognized by those charged with the care and feeding of animals that the feeding and watering receptacles should be placed at an elevation appropriate to the height of the animal. Food and water for small breeds of animals may be placed at or near ground level, while larger dogs are most appropriately fed at an elevation of a few feet. Still larger animals, such as horses and ponies, require greater elevation. For young animals, it is desirable that the elevation of the feeding dishes be progressively increased commensurate with the growth of the animal. Appropriate feeding heights provide for the comfort of the animal. Among certain breeds of animals, an inappropriate feeding height can be physically injurous.

In an attempt to locate the pertinent prior art, a search of the records of the United States Patent and Trademark Office was made. The search revealed the following issued U.S. patents:

U.S. Pat. No. 3,288,305; Bryant et al
U.S. Pat. No. 3,788,583; Byrd
U.S. Pat. No. 3,892,604; Keen et al
U.S. Pat. No. 3,589,658; Kopfman
U.S. Pat. No. 0,879,784; Mateka
U.S. Pat. No. 0,806,994; Pruser
U.S. Pat. No. 3,508,732; Trachtenberg et al
U.S. Pat. No. 3,661,121; Zielin The closest prior art appears to be U. S. Pat. No. 3,661,121 which shows a feeding stand having a standard in the form of channel members positioned back-to-back and secured together. A support ring, holding a feed dish, is adjustably secured to each channel member. Clamping means for securing the ring and dish to the standard includes a bracket extending from the ring, a clamping plate slidably carried within the channel member and a bolt and wing nut extending through the bracket and clamping plate. The dishes which extend in diametrically opposed directions from the standard are individually adjustable.

It is desirable that an animal be provided with food and water in a side-by-side relationship. This requirement cannot be met by the structure disclosed in U.S. Pat. No. 3,661,121. Feeding apparatus for dogs and other animals are frequently placed outdoors and are subject to an accumulation of dirt, rust and other contaminants. It is well known that dirt, rust and other contaminants accumulate more quickly within an enclosed or partially enclosed structure. It is noted that the slide plate and other portions of the clamping mechanism of the subject prior art device are carried within a partially closed channel member.

It is also highly desirable that the dishes be readily removable for purposes of cleansing and refilling. The ring and the dish are illustrated in each figure of U.S. Pat. No. 3,661,121 as an integral unit. There are no illustrations which show the ring and dish as separate elements. Further, thereis no teaching within the reference that would suggest that the elements are separable. Therefore, it must be assumed that the elements are permanently joined and removable only by means of sliding the clamping arrangement upwardly to be disconnected from the standard. This represents an undue inconvenience upcn the user.

The other references found during the search served to illustrate the state of the instant and other arts. None of the devices shown is considered to be an optimum animal feeding apparatus. It would be highly advantageous therefore to remedy the deficiencies of the prior art.

Accordingly, it is an object of the present invention to provide improved animal feeding apparatus.

Another object of the invention is the provision of apparatus for supporting a feeding dish or similar bowl at adjustable heights.

Another object of the invention is to provide an apparatus which will hold existing commercially available bowls and dishes.

Still another object of this invention is the provision of a holder wherein the bowls are readily removable.

Yet another object of the invention is to provide an apparatus which will provide a feed dish and a water dish in juxtaposition for the convenience of an animal.

Yet still another object of the invention is the provision of an adjustable bowl support having a minimal number of moving components.

And a further object of the instant invention is to provide an adjusting mechanism for the device of the present character which is relatively unaffected by dirt, dust and other mechanism impairing contaminants.

Still a further object of the invention is the provision of an adjustable bowl holding apparatus which is attachable to an upright surface, or alternately can be made free-standing.

Yet a further object of the invention is to provide an apparatus which is readily fabricated by conventional techniques in various sizes to accommodate a variety of uses.

Yet still a further object of the invention is the provision of an apparatus of the above type which is relatively inexpensive to manufacture, yet is exceedingly durable and maintenance free.

Briefly, to achieve the desired objects of the instant invention in accordance with a preferred embodiment thereof, first provided is a substantially rigid upright support member which can be secured to an upright surface, or alternately provided at the lower end thereof with free-standing means, such as a base or a portion designated to be encased within the ground. A substantially horizontal frame member is detachably securable to the upright support member. Means for detachably holding a commercially available bowl, or the type having an outwardly projecting lip, are carried by the horizontal frame member.

In accordance with an embodiment of the invention, the means for holding the bowl is in the form of a parametric frame element, which receives the body of the bowl therethrough. The outwardly projecting lip of the bowl rests upon the upper surface of the parametric frame element. A pair of spaced apart upright brackets extend from the frame member and receive the upright support member therebetween. A connecting member, such as a bolt and nut or clevis pin, extends through the upright brackets and the support member.

The foregoing and further and more specific objects and advantages of the present invention will become readily apparent to those skilled in the art from the following detailed description of preferred embodiments thereof, taken in conjunction with the drawings in which:

FIG. 1 is an upper frontal perspective view of an adjustable holder constructed in accordance with the teachings of the instant invention as it would appear when secured to an upright surface;

FIG. 2 is an elevation view of the device of FIG. 1, the device being partly broken and shown holding a bowl, the bowl being shown in broken outline;

FIG. 3 is a plan view of the apparatus of FIG. 1, a portion thereof being broken away;

FIG. 4 is an enlarged fragmentary perspective view of a portion of the device of FIG. 1; and FIG. 5 is a perspective view of an alternate embodiment of the instant invention illustrated as it would appear when in use.

Turning now to the drawings, in which like reference characters indicate corresponding elements throughout the several views, attention is first directed to FIG. 1 which shows an adjustable height bowl holding apparatus of the instant invention, generally designated by the reference character 10 having an upright support member 11 and a substantially horizontal frame member 12. Upright support member 11 has an upper end 13, lower end 14, front surface 15 and rear surface 17, as better viewed in FIG. 2. Upright support member 11 further includes side surfaces 18 and 19, the latter being seen in FIG. 3. A plurality of pairs of aligned bracket mounting holes 20 are spaced along support member 11 and extend therethrough between side surfaces 18 and 19.

For purposes of illustration, upright support member 11 is shown as fabricated from square box section structural metal, or substantially square metal tubing. The desired characteristics of strength and rigidity are exhibited by various equivalent shapes, such as channel section, and alternate material, such as wood and plastic. The length of support member 11 is readily determinable by the manufacturer in accordance with intended use. Upper and lower openings 22 and 23, respectively, extend through support member 11 between front surface 15 and rear surface 17. Lag bolts 24 are received through aligned pairs of mounting openings 22 and 23 for securing member 11 to any convenient or desired upright surface 25. Rear surface 17 bears against upright surface 25, while front surface 15 and side surfaces 18 and 19 are unobstructed.

Frame member 12 includes parametric elements 27 and 28 having openings 29 and 30, respectively, therethrough, and having upper surfaces 32 and 33, respectively. Parametric frame elements 27 and 28, as further illustrated in FIG. 3, reside in a side-by-side relationship, having one side of each joined along the line 34 and joined to brace element 35. The sides, or legs of parametric frame elements 27 and 28 which, in the preferred embodiment, are regular octagons are illustrated as fabricated from square stock and thus have a substantially square cross-section. The design is more for considerations of asthetics than function. As the description proceeds, it will be appreciated that a parametric frame element, to function in accordance with the teachings of the instant invention, may assume various shapes, such as hexagonal or circular. Further, the material of construction may have cylindrical, rectangular, T, or other cross-sectional shapes.

With reference to FIG. 4, there is seen a pair of upright brackets 37 and 38 extending from brace element 35. Brackets 37 and 38 are spaced to receive upright support member 11 therebetween. Spaced apart pairs of aligned bracket apertures 39 extend through brackets 37 and 38, each aperture 39 having an element in bracket 37 and a corresponding aligned element in bracket 38. Apertures 39 are spaced to correspond with the spacing of holes 20. Also provided is bolt 40 and wing nut 42.

In the assembled position, as best illustrated in FIGS. 1-3, upright support member 11 is received between brackets 37 and 38 such that bracket 37 is adjacent side surface 18 and bracket 38 is adjacent side surface 19, with brace element 35 near front surface 15. One bolt 40 extends concurrently through one aperture 39 and one hole 20, while a second bolt 40 passes through another aperture 39 and hole 20. Each bolt 40 is secured by a wing nut 42 in accordance with conventional practice. Alternate fastening means, other than the combination of bolt 40 and nut 42, can serve to secure horizontal frame member 12 to upright support member 11. An exemplary alternate fastening means is the well-known clevis pin.

FIG. 2 shows, in broken outline, a conventional bowl 43 having continuous generally upright sidewall 44 and bottom 45. Lip 47 is continuous about bowl 43 and projects outwardly from sidewall 44. Bowl 43 is intended as an illustration of a typical commercially available bowl. While the specific design of such bowls varies in accordance with the manufacturer, all such bowls have elements corresponding to those denoted in the illustration. Further, bowls of the general character described vary greatly in size. Conventional bowls, especially for feeding small animals, usually have a diameter of from six to ten inches. Other bowls may be larger or smaller. Continuous sidewall 44 is received through openings 28 and 29, while lip 47 rests upon respective upper surface 32 and 33. As will be readily appreciated by those skilled in the art, parametric elements 27 and 28 are readily formed in various sizes to accommodate selected bowls.

Two bowls 43 are held by the device of the instant invention, one by each parametric frame element 27 and 28. The height of the bowls is readily adjusted by the alignment of apertures 39 with holes 20 of desired height. During adjustment or assembly, orientation of horizontal frame member 12 relative upright support element 11 is not a consideration, since either side of horizontal frame member 12 may be considered the top or the bottom. Bowls 43 are readily removed for cleansing or refilling by lifting upwardly. Further, it is pointed out that since parametric elements 27 and 28 are in juxtaposition and horizontal frame member 12 projects in a single direction from upright support member 11, the device is readily attached to any vertical surface, such as the wall of a dwelling or a fence.

FIG. 5 illustrates an alternate embodiment of the instant invention, having corresponding elements generally analogous to those described in connection with FIGS. 1-4. Modified upright support member 11a is substantially similar to previously described upright support member 11, except being longer by reason of an extension below lower end 14. The extension provides that support member 11a can be driven into the ground to provide a free standing device. In this configuration, a second horizontal frame element 12 can be used in combination with upright support member 11 to provide a pair of bowls at differing heights. Accordingly, feed and water can be supplied to two animals at the optimum feeding height for each animal. In accordance with even further embodiments, lower end 14 of upright support member 11 may be passed in telescope fashion over a stake planted in the ground or welded or otherwise affixed to a base.

Another modification may involve the use of larger holes 20 and apertures 39 to facilitate alignment of the attachment means, such as bolt 40.

Various other modifications and variations to the embodiments herein chosen for purposes of illustration will readily occur to persons skilled in the art to which the instant invention pertains. To the extent that such modifications and variations do not depart from the spirit of the invention, they are intended to be included within the scope thereof, which is limited only by a fair interpretation of the appended claims.

Having fully described and disclosed the present invention and alternate embodiments thereof in such clear and concise terms as to enable those skilled in the art to understand and practice the same, the invention claimed is:

1. A holder for detachably supporting at least one bowl having a continuous generally upright sidewall with an outwardly projecting lip at varying predetermined heights above the ground, said holder comprising:
   a substantially rigid support member, said support member being made of substantially square metal tubing, said tubing having sides, a plurality of pairs of aligned bracket mounting holes through opposite sides of the support member, said pairs of aligned holes being substantially uniformly spaced along at least a portion of the support member;
   means for positioning the support member substantially upright at a predetermined distance above ground;
   a frame member having a pair of substantially equal regular octagonal bowl supporting elements, each element adapted to hold one of the bowls, said bowl supporting elements having sides of substantially equal length, said sides having a substantially square cross section, a side of each of the elements being joined together, said elements being integral with the frame member;
   attachment means for detachably securing the frame member to the support member so that the octagonal supporting elements are substantially horizontal, said attachment means having a pair of brackets secured to the frame so that the bracket are spaced apart a distance such that the support member can fit between said brackets, pairs of aligned bracket apertures through the brackets, said pairs of aligned bracket apertures through the brackets being spaced so that they can be aligned with two adjacent pairs of aligned bracket holes formed through the support member, and means insertable through the aligned pairs of apertures and holes for removably securing the frame to the support member so that the octagonal bowl supporting elements can be positioned at predetermined heights above ground.

2. The holder of claim 1 in which the means for positioning the support member comprises a plurality of aligned pairs of mounting openings in the support member and bolt means adapted to extend through pairs of aligned mounting openings to secure the support member to a substantially upright surface.

3. The holder of claim 2 in which the means for removably securing the frame to the support member is a pair of bolts and wing nuts.

* * * * *